US012784642B2

(12) United States Patent
Lee

(10) Patent No.: US 12,784,642 B2
(45) Date of Patent: Nov. 3, 2026

(54) DISPLAY DEVICE

(71) Applicant: LG Display Co., Ltd., Seoul (KR)

(72) Inventor: JungHyun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/222,563

(22) Filed: May 29, 2025

(65) Prior Publication Data

US 2026/0188173 A1 Jul. 2, 2026

(30) Foreign Application Priority Data

Dec. 31, 2024 (KR) ........................ 10-2024-0202277

(51) Int. Cl.
*G09G 3/20* (2006.01)

(52) U.S. Cl.
CPC ..... *G09G 3/2092* (2013.01); *G09G 2300/043* (2013.01); *G09G 2300/0819* (2013.01); *G09G 2310/0297* (2013.01); *G09G 2330/021* (2013.01)

(58) Field of Classification Search
CPC ......... G09G 2310/0297; G09G 3/2092; G09G 3/2096; G09G 3/2074; G09G 3/3677; G09G 3/3688; G09G 2310/0275; G09G 3/3291
See application file for complete search history.

(56) References Cited

U.S. PATENT DOCUMENTS

2018/0284926 A1* 10/2018 Kim .................... G06F 3/04164
2021/0109636 A1* 4/2021 Lius ..................... A61B 5/1172
2023/0115951 A1* 4/2023 Lin ........................ G06V 40/13
345/173

FOREIGN PATENT DOCUMENTS

KR 10-2024-0105992 A 7/2024

* cited by examiner

*Primary Examiner* — William Boddie
*Assistant Examiner* — Alecia D English
(74) *Attorney, Agent, or Firm* — Birch, Stewart, Kolasch & Birch, LLP

(57) ABSTRACT

A display device is provided, which can compensate for degradation of a thin film transistor in a demultiplexer circuit. The demultiplexer array in the display device includes a compensation circuit configured to compensate for a threshold voltage of a monitoring transistor, which is configured to share a control node with touch switching transistors, store the threshold voltage in a capacitor, compensate a touch control signal applied to the capacitor for the threshold voltage stored in the capacitor, and apply the touch control signal compensated for the threshold voltage to the control node.

20 Claims, 16 Drawing Sheets

DEMUX1 : DM11, DM12

DEMUX2 : DM21, DM22

DEMUX1 : DM11, DM12

DEMUX2 : DM21, DM22

DISPLAY DEVICE

CROSS-REFERENCE TO RELATED APPLICATION

This application claims priority to Korean Patent Application No. 10-2024-0202277, filed in the Republic of Korea on Dec. 31, 2024, the entire contents of which is hereby expressly incorporated by reference into the present application.

BACKGROUND

Field of the Invention

The present disclosure relates to a display device that can compensate for and address degradation of a thin film transistor in a demultiplexer circuit.

Discussion of the Related Art

A touch sensor that can input information by touch on a screen of a display device has been widely applied not only to a portable information device such as a smartphone but also to various display devices such as a laptop, a monitor, and home appliances.

The display device can be embedded with a touch sensor in a display panel as it becomes large along with lightweight and thinning. The display device embedded with a touch sensor can be driven by being time-divided into a display operation period and a touch operation period.

The display device can include a demultiplexer (hereinafter referred to as DEMUX) circuit arranged on the display panel to distribute data signals supplied from a driving circuit to a plurality of data lines.

In the DEMUX circuit, since each of thin film transistors is driven not only during the display operation period but also during the touch operation period, it can be degraded due to stress caused by a gate high voltage and stress caused by a high drain current.

The degradation of the thin film transistors of the DEMUX circuit can be worsen when a temperature rises.

SUMMARY OF THE DISCLOSURE

Accordingly, the present disclosure is directed to providing a display device that substantially obviate one or more problems due to limitations and disadvantages of the related art.

In one or more aspects, the present disclosure provides a display device that can compensate for degradation of a thin film transistor in a DEMUX circuit.

Additional advantages and features of the disclosure will be set forth in part in the description which follows and in part will become apparent to those having ordinary skill in the art upon examination of the following or can be learned from practice of the disclosure. The technical benefits and other advantages of the disclosure can be realized and attained by the structure particularly pointed out in the written description and claims hereof as well as the appended drawings.

To achieve these and other benefits and in accordance with the purpose of the disclosure, as embodied and broadly described herein, the present disclosure provides a display device including a display panel including a display area in which a plurality of subpixels are arranged, a driving circuit configured to output data signals during a display operation period and a touch driving signal during a touch operation period, through each output terminal, and a DEMUX array including a plurality of DEMUX circuits and a compensation circuit, which are arranged between the driving circuit and the display area in the display panel. Each of the plurality of DEMUX circuits can include a plurality of data switching transistors connected between the output terminal of the driving circuit and a plurality of data lines, and a plurality of touch switching transistors connected between the output terminal of the driving circuit and the plurality of data lines, sharing a control node. The compensation circuit can be configured to compensate for a threshold voltage of a monitoring transistor sharing the control node with the plurality of touch switching transistors to store the threshold voltage in a capacitor, compensate a touch control signal applied to the capacitor for the threshold voltage stored in the capacitor, and apply the touch control signal compensated for the threshold voltage to the control node.

Another aspect of the present disclosure provides a display device including a display panel including a display area in which a plurality of subpixels are arranged, a driving circuit configured to output data signals during a display operation period and a touch driving signal during a touch operation period, through each output terminal, and a DEMUX array including a plurality of DEMUX circuits and a compensation circuit, which are arranged between the driving circuit and the display area in the display panel, wherein each of the plurality of DEMUX circuits includes first and second switching transistors connected between the output terminal of the driving circuit and a plurality of data lines. The compensation circuit can include a first compensation circuit and a second compensation circuit. The first compensation circuit can be configured to compensate for a first threshold voltage of a first monitoring transistor, which is configured to share a first control node with the first switching transistors of the plurality of DEMUX circuits, to store the first threshold voltage in a first capacitor, compensate a first control signal applied to the first capacitor for the first threshold voltage stored in the first capacitor, and apply the first control signal compensated for the first threshold voltage to the first control node. The second compensation circuit can be configured to compensate for a second threshold voltage of a second monitoring transistor, which is configured to share a second control node with the second switching transistors of the plurality of DEMUX circuits, to store the second threshold voltage in a second capacitor, compensate a second control signal applied to the second capacitor for the second threshold voltage stored in the second capacitor, and apply the second control signal compensated for the second threshold voltage to the second control node.

Other aspects of the present disclosure provide a display device including a display panel including a display area in which a plurality of subpixels are arranged, a driving circuit configured to output data signals through each output terminal, and a DEMUX array including a plurality of DEMUX circuits and a compensation circuit, which are arranged between the driving circuit and the display area in the display panel, wherein each of the plurality of DEMUX circuits includes first and second switching transistors connected between the output terminal of the driving circuit and a plurality of data lines. The compensation circuit can include a first compensation circuit and a second compensation circuit. The first compensation circuit can be configured to compensate for a first threshold voltage of a first monitoring transistor, which is configured to share a first control node with the first switching transistors of the plurality of DEMUX circuits, to store the first threshold voltage in a first capacitor, compensate a first control signal applied to the first capacitor for the first threshold voltage stored in the first capacitor, and apply the first control signal compensated for the first threshold voltage to the first control node. The second compensation circuit can be configured to compensate for a second threshold voltage of a second monitoring transistor, which is configured to share a second control node with the second switching transistors of the plurality of DEMUX circuits, to store the second threshold voltage in a second capacitor, compensate a second control signal applied to the second capacitor for the second threshold voltage stored in the second capacitor, and apply the second control signal compensated for the second threshold voltage to the second control node.

It is to be understood that both the foregoing general description and the following detailed description of the present disclosure are examples and explanatory and are intended to provide further explanation of the disclosure.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
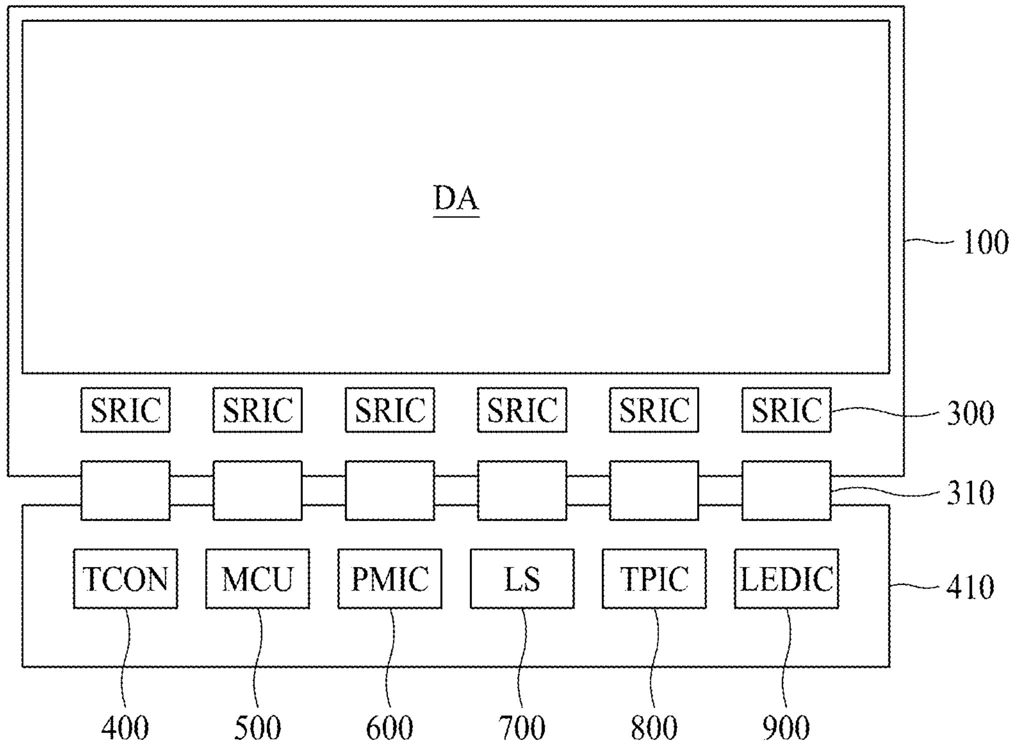
FIG. 1 is an example view illustrating a configuration of a touch display device according to one or more embodiments of the present disclosure.

Advantages and features of the present disclosure, and implementation methods thereof will be clarified through the following embodiments, described with reference to the accompanying drawings. The present disclosure may, however, be embodied in different forms and should not be construed as being limited to the embodiments set forth herein. Rather, these embodiments are provided so that this disclosure will be thorough and complete, and will fully convey the scope of the present disclosure to those skilled in the art.

The shapes, sizes, ratios, angles, and numbers disclosed in the drawings for describing embodiments of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case in which “comprise,” “have,” and “include” described in the present disclosure are used, another part can also be present unless “only” is used. The terms in a singular form can include plural forms unless noted to the contrary.

In construing an element, the element is construed as including an error region although there is no explicit description thereof.

In describing a positional relationship, for example, when the positional order is described as “on,” “above,” “below,” “beneath,” and “next,” the case of no contact therebetween can be included, unless “just” or “direct” is used.

If it is mentioned that a first element is positioned “on” a second element, it does not mean that the first element is essentially positioned above the second element in the figure. The upper part and the lower part of an object concerned can be changed depending on the orientation of the object. Consequently, the case in which a first element is positioned “on” a second element includes the case in which the first element is positioned “below” the second element as well as the case in which the first element is positioned “above” the second element in the figure or in an actual configuration.

In describing a temporal relationship, for example, when the temporal order is described as “after,” “subsequent,” “next,” and “before,” a case which is not continuous can be included, unless “just” or “direct” is used.

It will be understood that, although the terms “first,” “second,” etc., can be used herein to describe various elements, these elements should not be limited by these terms. These terms are only used to distinguish one element from another. For example, a first element could be termed a second element, and, similarly, a second element could be termed a first element.

It should be understood that the term “at least one” includes all combinations related with any one item. For example, “at least one among a first element, a second element and a third element” can include all combinations of two or more elements selected from the first, second and third elements as well as each element of the first, second and third elements. Further, the term "can" fully encompasses all the meanings and coverages of the term "may" and vice versa.

Features of various embodiments of the present disclosure can be partially or overall coupled to or combined with each other, and can be variously inter-operated with each other and driven technically. The embodiments of the present disclosure can be carried out independently from each other, or can be carried out together in a co-dependent relationship.

Hereinafter, the aspects of the present disclosure will be described with reference to the accompanying drawings. Since a scale of each of elements shown in the accompanying drawings is different from an actual scale for convenience of description, the present disclosure is not limited to the shown scale. Further, all the components of each display device and each display panel according to all aspects of the present disclosure are operatively coupled and configured.

Figure 2:
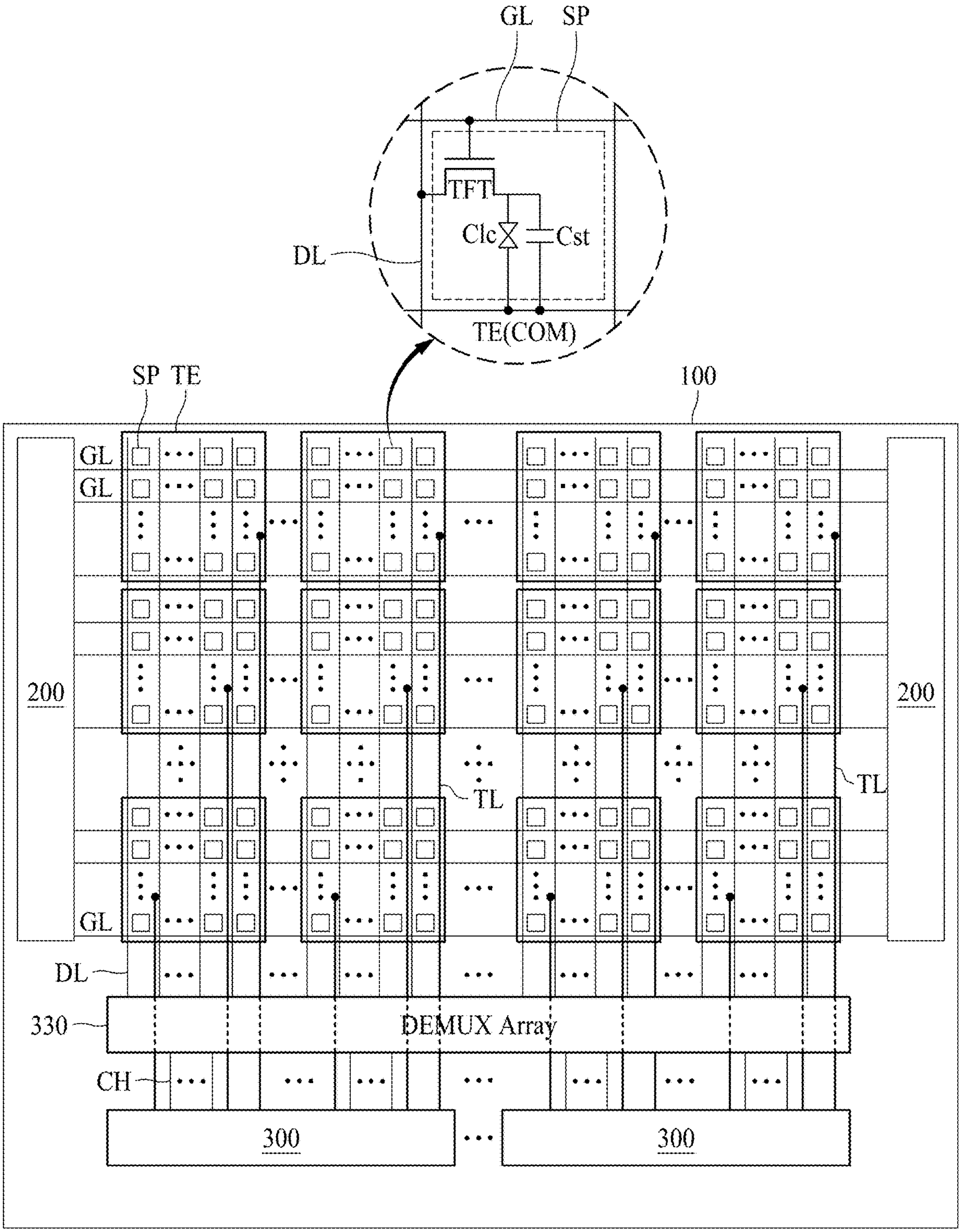
FIG. 2 is an example view illustrating a configuration of a display panel in a touch display device according to one or more embodiments of the present disclosure.
Figure 3:
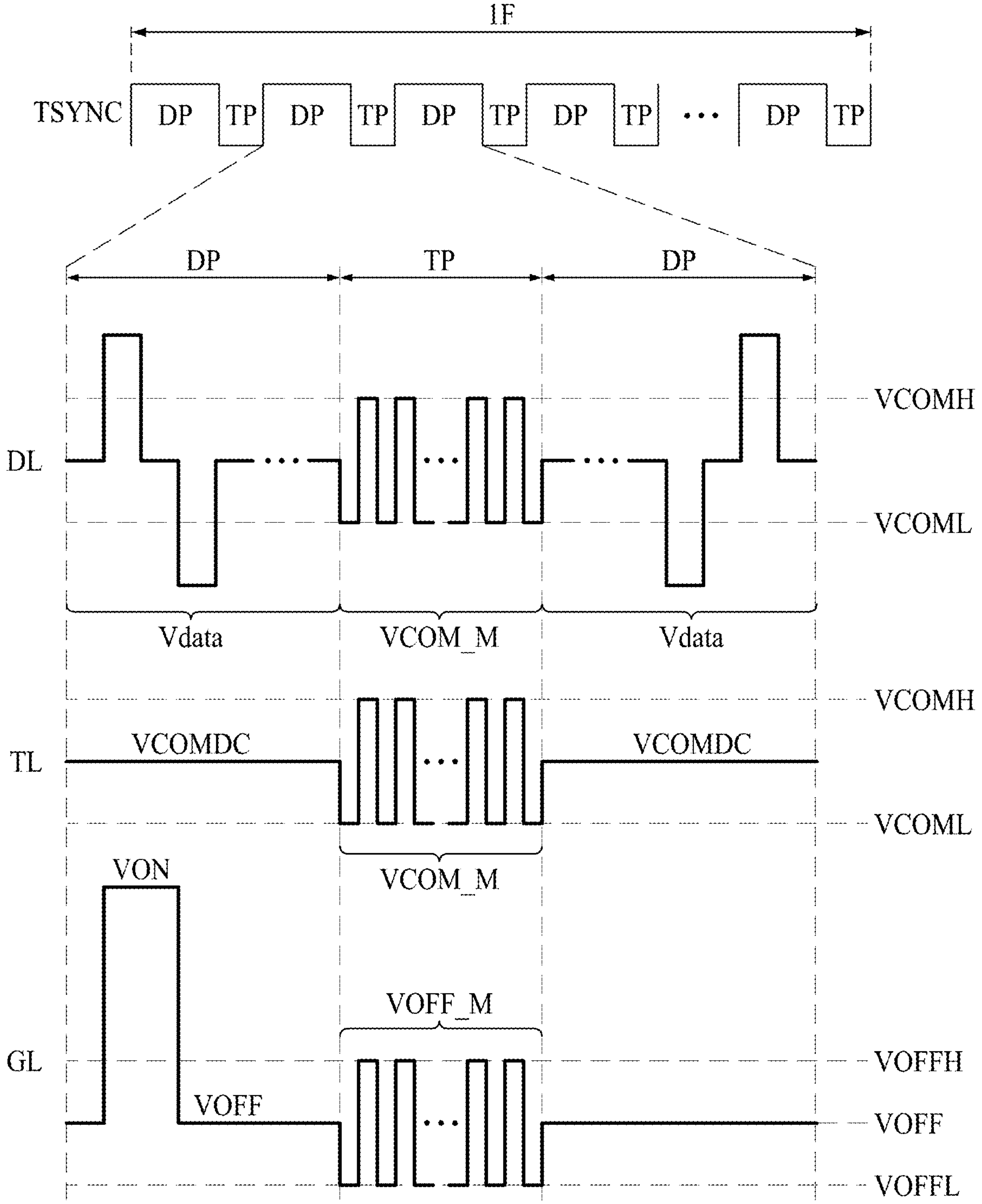
FIG. 3 is an example view illustrating driving waveforms of a touch display device according to one or more embodiments of the present disclosure.

FIG. 1 is an example view illustrating a configuration of a touch display device according to one or more embodiments of the present disclosure, FIG. 2 is an example view illustrating a configuration of a display panel in a touch display device according to one or more embodiments of the present disclosure, and FIG. 3 is an example view illustrating driving waveforms of a touch display device according to one or more embodiments of the present disclosure.

Referring to FIGS. 1-3, the touch display device according to one or more embodiments can include a display panel 100, a gate driver 200, a source-readout integrated circuit (SRIC) 300, a timing controller (TCON) 400, a micro controller unit (MCU) 500, a power management integrated circuit (PMIC) 600, a level shifter (LS) 700, and a touch power integrated circuit (TPIC) 800. In one embodiment, the gate driver 200, the SRIC 300, the TCON 400, and the LS 700 can be collectively referred to as a display driver circuit. In one embodiment, the SRIC 300, the MCU 500, and the PMIC 600 can be collectively referred to as a touch driver circuit.

The touch display device according to one embodiment can further include a backlight unit that a light emitting diode (LED) as a light source to emit light to the display panel 100, and an LED drive integrated circuit (LEDIC) 900 that drives the LED of the backlight unit. The LEDIC 900 can be represented as a backlight driver.

The display panel 100 according to one embodiment can include a display area DA, a gate driver 200 embedded in a bezel area, a plurality of source-readout integrated circuits (SRICs) 300 arranged in the bezel area, and a demultiplexer (DEMUX) array 330 arranged in the bezel area between the plurality of SRICs 300 and the display area DA.

At least one of an amorphous silicon transistor using an amorphous silicon semiconductor, a low temperature poly silicon (LTPS) transistor using an LTPS semiconductor, or an oxide transistor using a metal-oxide semiconductor can be used as thin film transistors arranged in the display area DA, the gate driver 200, and the DEMUX array 330 of the display panel 100 can use. The display area DA, the gate driver 200, and the DEMUX array 330 of the display panel 100 according to one embodiment can include oxide transistors.

The display area DA of the display panel 100 can have a touch sensing function and a display function. The display panel 100 can display an image through the display area DA in which subpixels SP are arranged in a matrix form.

The display panel 100 can read out whether the user touches in a capacitance manner by using common electrode touch electrodes TE included in a pixel matrix of the display area DA.

A capacitance touch sensing method can use any one of a mutual capacitance touch sensing method and a self-capacitance touch sensing method. Hereinafter, the self-capacitance touch sensing method will be described as an example.

The subpixels SP can include a red subpixel that emits light of a red wavelength, a green subpixel that emits light of a green wavelength, a blue subpixel that emits light of a blue wavelength, and can further include a white subpixel that emits white light to increase luminance. The unit pixel can include two, three or four subpixels SP among the red, green, blue and white subpixels SP.

The subpixel SP can include a thin film transistor TFT connected to a gate line GL and a data line DL, and a liquid crystal capacitor Clc and a storage capacitor Cst, which are connected between the thin film transistor TFT and a touch electrode TE that also serves as a common electrode COM. The liquid crystal capacitor Clc can charge a difference voltage between a data signal supplied to a pixel electrode through the thin film transistor TFT and a common voltage VCOMDC supplied to the touch electrode TE and drive the liquid crystal in accordance with the charged voltage, thereby adjusting light transmittance. The storage capacitor Cst can stably maintain the voltage charged in the liquid crystal capacitor Clc.

The display panel 100 can include a touch electrode (TE) array that includes a plurality of touch electrodes TE having a touch sensor function and a common electrode function of a pixel matrix. The touch electrode (TE) array can include a plurality of touch electrode (TE) columns, and each touch electrode (TE) column can include a plurality of touch electrodes TE arranged in a direction of the data line DL and a plurality of touch routing lines TL individually connected to the plurality of touch electrodes TE and connected to the SRIC 300. In the plurality of touch electrodes TE, the common electrode located in the pixel matrix is divided into a plurality of segments, and each touch electrode TE can be formed in a specific size including a plurality of subpixels SP in consideration of a size of a touch point. The touch electrode TE can serve as a common electrode commonly connected to the plurality of subpixels SP that overlap the touch electrode TE, and can serve as each touch sensor forming a capacitor when a user's touch occurs.

The display panel 100 can be driven by being time-divided into a display operation period DP and a touch operation period TP. In one embodiment, one frame 1F can be time-divided driven into a plurality of display operation periods DP and a plurality of touch operation periods TP in which each display operation period DP and each touch operation period TP are alternately operated by a touch synchronization signal TSYNC. During one frame 1F, the display panel 100 is scanned once by the plurality of display operation periods DP, whereas the touch electrode (TE) array can be driven and sensed twice or more by the plurality of touch operation periods TP.

During the display operation period DP, the gate driver 200 and the SRIC 300 can charge (write) the data signal in the subpixels SP of a corresponding pixel block in the display panel 100.

During the touch operation period TP, the SRIC 300 can apply a touch driving signal VCOM_M to the touch electrodes TE of the corresponding touch block in the display panel 100 and read out and sense a change in capacitance from the touch electrodes TE to which the touch driving signal VCOM_M is applied.

During the display operation period DP of the touch synchronization signal TSYNC, the gate driver 200 can supply scan pulses of a gate-on voltage VON to the gate lines GL of the corresponding pixel block and sequentially drive the scan pulses. The plurality of SRICs 300 can supply a data signal Vdata to the data lines DL through the DEMUX array 330 and supply the common voltage VCOMDC to the touch electrodes TE through the touch routing lines TL, thereby charging a pixel voltage corresponding to the data signal Vdata in each of the subpixels SP of the corresponding pixel block.

During the touch operation period TP of the touch synchronization signal TSYNC, the plurality of SRICs 300 can supply the touch driving signal VCOM_M to the touch routing lines TL and at the same time supply the touch driving signal VCOM_M to the data lines DL through the DEMUX array 330, and the gate driver 200 can supply a gate-off modulation signal VOFF_M to the gate lines GL. The touch driving signal VCOM_M and the gate-off modulation signal VOFF_M can have the same phase and the same amplitude. Accordingly, during the touch operation period TP, the display panel 100 can minimize resistor capacitor (RC) load of the touch electrodes TE by minimizing parasitic capacitance between the touch electrodes TE and the gate lines GL and between the touch electrodes TE and the data lines DL, thereby improving touch sensing sensitivity.

The touch driving signal VCOM_M can be expressed as a common voltage modulation signal or a load free driving (LFD) signal. The gate-off modulation signal VOFF_M can be expressed as a load free driving (LFD) signal.

Referring to FIG. 2, the DEMUX array 330 can supply the data signals Vdata by time-dividing the data signals Vdata supplied from the plurality of SRICs 300 through a plurality of output terminals CH during the display operation period DP and distributing the data signals Vdata to the plurality of data lines DL. Accordingly, the number of the output terminals CH of the SRIC 300 can be decreased compared to the number of the data lines DL.

The DEMUX array 330 can supply the touch driving signal VCOM_M supplied from the plurality of SRICs 300 through the plurality of output terminals CH to the plurality of data lines DL during the touch operation period DP.

The DEMUX array 330 can include a plurality of 1:k DEMUX circuits that transmit the output of each output terminal CH of the SRIC 300 to k number of data lines DL (where k is an integer greater than 2). Accordingly, the number of output terminals CH of the SRIC 300 can be reduced to 1/k compared to the number of data lines DL.

The DEMUX array 300 according to one embodiment can include data switching transistors for transmitting the data signal Vdata during the display operation period DP and touch switching transistors for transmitting the touch driving signal VCOM_M during the touch operation period TP. Accordingly, the data switching transistors can be turned off during the touch operation period TP, and the touch switching transistors can be turned off during the display period DP, thereby having a recovery time.

The DEMUX array 300 according to one embodiment further includes a compensation circuit for sampling and compensating for threshold voltages of the touch switching transistors at a compensation time immediately before the touch operation period TP, thereby compensating for shifted threshold voltages even though the touch switching transistors are degraded and thus the threshold voltages are shifted. This will be described in detail later.

The gate driver 200 can be arranged in at least one of a plurality of bezel areas located at an outer portion of the display area DA in the display panel 100. In one embodiment, the gate driver 200 can be arranged in first and second bezel areas facing each other with the display area DA interposed therebetween, thereby driving the plurality of gate lines GL at both ends of the gate line GL. The gate driver 200 can be embedded in the display panel 100 in a gate in panel (GIP) type consisting of thin film transistors formed in the same process as the thin film transistors TFT in the display area DA.

The gate driver 200 can individually drive a plurality of gate lines GL connected to the subpixels SP in units of row lines. The gate driver 200 can receive a plurality of gate control signals from the level shifter (LS) 700, receive a gate-on voltage VON from the power management integrated circuit (PMIC) 600 and receive a gate-off voltage VOFF and a gate-off modulation signal VOFF_M from the touch power integrated circuit (TPIC) 800.

The gate driver 200 can generate gate pulses (scan pulses) according to the gate control signals during the display operation period DP to sequentially and individually drive the gate lines GLs of the corresponding pixel block. In the display operation period DP, the gate driver 200 can supply the gate pulses of the gate-on voltage VON during a driving period 1H of the corresponding gate line GL and supply the gate-off voltage VOFF during a non-driving period of the corresponding gate line GL.

The gate driver 200 can supply the gate-off modulation signal VOFF_M supplied from the touch power integrated circuit (TPIC) 800 to the gate lines GL during the touch operation period TP.

The plurality of source-readout integrated circuits (SRIC) 300 can divide and drive the data lines DL and the touch routing lines TL of the display panel 100. The SRIC 300 can be expressed as a touch-data driver. The SRIC 300 can drive the data line DL. The SRIC 300 can drive the touch routing lines TL and sense a readout signal fed back from the touch routing lines TL. The SRIC 300 can include a source driver that supplies data signals to the data lines DL and supplies a common voltage VCOMDE to the touch electrodes TE during the display operation period DP, and a touch readout circuit that supplies a touch driving signal VCOM_M to the data lines DL and the touch electrodes TE and reads out and senses a change in capacitance of each of the touch electrodes TE during the touch operation period TP.

The plurality of SRICs 300 can receive image data and data control signals from the timing controller (TCON) 400, and can receive the touch synchronization signal TSYNC from the TCON 400 or the microcontroller unit (MCU) 500. The plurality of SRICs 300 can receive the common voltage VCOMDC and the touch driving signal VCOM_M from the touch power integrated circuit (TPIC) 800. The plurality of SRICs 300 can receive reference gamma voltages from the PMIC 600 or the TPIC 800.

The plurality of SRICs 300 can subdivide the reference gamma voltages during the display operation period DP, convert digital image data into analog data signals by using the subdivided gamma voltages and supply the converted data signals to the data line DL through the DEMUX array 330 of the display panel 100. The plurality of SRICs 300 can supply data signals, of which polarity is inverted in various inversion methods, to the data lines DL through the DEMUX array 330 during the display operation period DP. The plurality of SRICs 300 can supply a DC common voltage VCOMDC to the touch electrodes TE through the touch routing lines TL during the display operation period DP.

The plurality of SRICs 300 can supply the received touch driving signal VCOM_M to the touch electrodes TE through the touch routing lines TL during the touch operation period TP and supply the received touch driving signal VCOM_M to the data line DL through the DEMUX array 330. The plurality of SRICs 300 can sense a readout signal, which is fed back from the driven touch electrodes TE through the touch routing lines TL, during the touch operation period TP, can generate touch sensing data by signal-processing the readout signal, and can supply the generated touch sensing data to the MCU 500.

The plurality of SRICs 300 can generate switching control signals of the DEMUX array 330 by using the control signals supplied to the timing controller (TCON) 400 and supply the generated switching control signals to the DEMUX array 330 during the display operation period DP and the touch operation period TP.

The plurality of SRICs 300 can be packaged in the bezel area of the display panel 100 in a chip-on-glass (COG) method. In one embodiment, the plurality of SRICs 300 can be individually packaged in a circuit film such as a chip-on-film (COF) and bonded to the display panel 100 in a tape automatic bonding (TAB) method.

The timing controller (TCON) 400 can receive image data and synchronization signals from a host system. For example, the host system can be any one of systems of a computer, a TV system, a set-top box, a tablet, and a portable terminal such as a mobile phone. The synchronization signal can include a dot clock, a data enable signal, a vertical synchronization signal, a horizontal synchronization signal, and the like.

The TCON 400 can receive the touch synchronization signal TSYNC generated by the MCU 500, or can generate the touch synchronization signal TSYNC to supply the same to the MCU 500.

The TCON 400 can generate data control signals for controlling an operation timing of the SRIC 300 by using synchronization signals, the touch synchronization signal TSYNC, and timing setting information stored in a register and supply the generated data control signals to the SRIC 300. For example, the data control signals can include a source start pulse used to control a latch timing of data, a source sampling clock, a source output enable signal for controlling an output timing of data, and a polarity control signal for controlling a polarity of a data signal.

The TCON 400 can generate timing control signals such as a start pulse, an on-clock, and an off-clock, which are required for generating the gate control signal of the level shifter (LS) 700, by using synchronization signals, the touch synchronization signal TSYNC, and timing setting information stored in the register, and can supply the timing control signals to the level shifter (LS) 700.

The level shifter (LS) 700 can generate a plurality of gate control signals by level-shifting or logic-processing the timing control signals supplied from the TCON 400, and can supply the generated gate control signals to the gate driver 200. For example, the LS 700 can generate a plurality of gate shift clocks in which a rising timing synchronized with the on-clock supplied from the TCON 400 is different from a falling timing synchronized with the off-clock, output the gate shift clocks to the gate driver 200, and can level-shift the start pulse and the reset pulse, which are supplied from the TCON 400, to output the same to the gate driver 200.

The TCON 400 can store the image data received from the host system in a memory. The TCON 400 can perform various image processes for image quality compensation and power consumption reduction for the image data and store the image data in the memory. The TCON 400 can read image data of a corresponding pixel block from the memory at a reading speed faster than a writing speed during each display operation period DP, and can supply the image data and the data control signals to the plurality of SRICs 300.

The microcontroller unit (MCU) 500 can generate a touch synchronization signal TSYNC or receive the touch synchronization signal TSYNC from the TCON 400. The MCU 500 can generate various touch control signals including a pulse width modulation (PWM) signal required for touch driving and sensing by using the touch synchronization signal TSYNC. The MCU 500 can supply the touch synchronization signal TSYNC and touch control signals including a PWM signal to the touch power integrated circuit (TPIC) 800, the SRIC 300, and the like.

The MCU 500 can receive touch sensing data from the plurality of SRICs 300 to generate touch coordinates of a touch node where a touch has occurred, and can supply the generated touch coordinates to the host system.

The power management integrated circuit (PMIC) 600 can generate and supply various driving voltages required in the touch display device by receiving an input voltage. The PMIC 600 can generate and supply various driving voltages required in the touch power integrated circuit (TPIC) 800, the TCON 400, the MCU 500, the SRIC 300, the LS 700, and gate driver 200 by using the input voltage. In one embodiment, the PMIC 600 can embed the LS 700 therein.

The touch power integrated circuit (TPIC) 800 can receive the plurality of driving voltages from the PMIC 600 and receive the touch control signal from the MCU 500.

During the display operation period DP of the touch synchronization signal TSYNC, the TPIC 800 can select the gate-off voltage VOFF supplied from the PMIC 600 and supply the same to the gate driver 200, and can select the DC common voltage VCOMDC supplied from the PMIC 600 and supply the same to the plurality of SRICs 300.

During the touch operation period TP of the touch synchronization signal TSYN, the TPIC 800 can generate the touch driving signal VCOM_M and supply the same to the plurality of SRICs 300 and generate the gate-off modulation signal VOFF_M and output the same to the gate driver 200. The TPIC 800 can generate the touch driving signal VCOM_M for alternating a high common voltage VCOMH and a low common voltage VCOML, by level-shifting the PWM signal, and can generate the gate-off modulation signal VOFF_M for alternating a gate-off high voltage VOFFH and a gate-off low voltage VOFFL. The TPIC 800 can generate the high common voltage VCOMH, the low common voltage VCOML, the gate-off high voltage VOFFH, and the gate-off low voltage VOFFL by converting a digital value stored in an internal memory into an analog voltage.

In one embodiment, the TPIC 800 or the PMIC 700 can generate reference gamma voltages and supply the reference gamma voltages to the plurality of SRICs 300 during the display operation period DP.

Referring back to FIG. 1, the TCON 400, the MCU 500, the PMIC 600, the LS 700, the TPIC 800, and the LEDIC 900 can be packaged in a printed circuit board (PCB) 410, and can be electrically connected to the display panel 100 through a plurality of flexible printed circuits (FPCs) 310.

Figure 4:
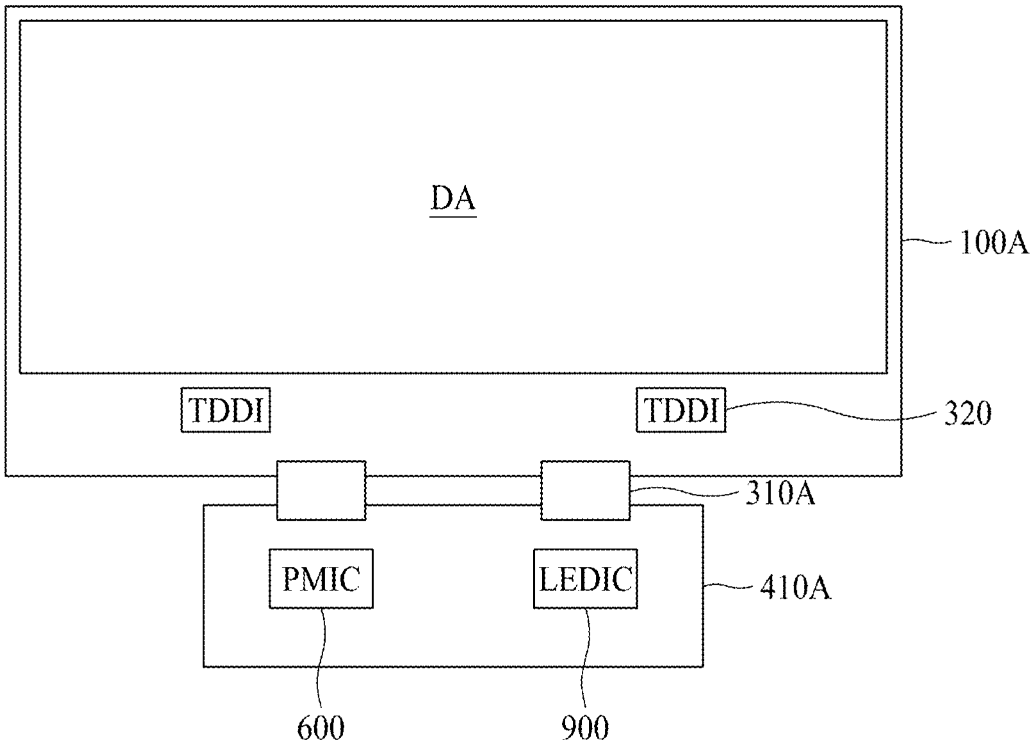
FIG. 4 is an example view illustrating a configuration of a touch display device according to one or more embodiments of the present disclosure.

FIG. 4 is an example view illustrating a configuration of a touch display device according to one or more embodiments of the present disclosure.

Referring to FIG. 4, the touch display device can include a plurality of touch display drive integrated circuits (TDDI) 320 arranged in the bezel area of the display panel 100A.

The TDDI 320 can be an integrated IC in which the SRIC 300, the TCON 400, the MCU 500, the LS 700, and the TPIC 800 described above with reference to FIG. 1 are all integrated. The PMIC 600 and the LEDIC 900 can be packaged in the PCB 410A connected to the display panel 100 through the FPC 310A. Thus, since the number of ICs 320, 600 and 900, the number of FPCs 310A and the size of the PCB 410A can be minimized, power consumption can be reduced, and manufacturing costs can be reduced.

Referring to FIGS. 2 to 4, the plurality of TDDI 320 can supply the data signal Vdata to the data lines DL through the DEMUX array 330 and supply the common voltage VCOMDC to the touch electrodes TE through the touch routing lines TL during the display operation period DP. The plurality of TDDI 320 can supply the data signal Vdata, of which polarity is inverted in various inversion methods, to the data lines DL through the DEMUX array 330 during the display operation period DP. During the touch operation period TP, the plurality of TDDI 320 can supply the touch driving signal VCOM_M to the touch electrodes TE through the touch routing lines TL and supply the same to the touch lines DL through the DEMUX array 330.

Figure 5:
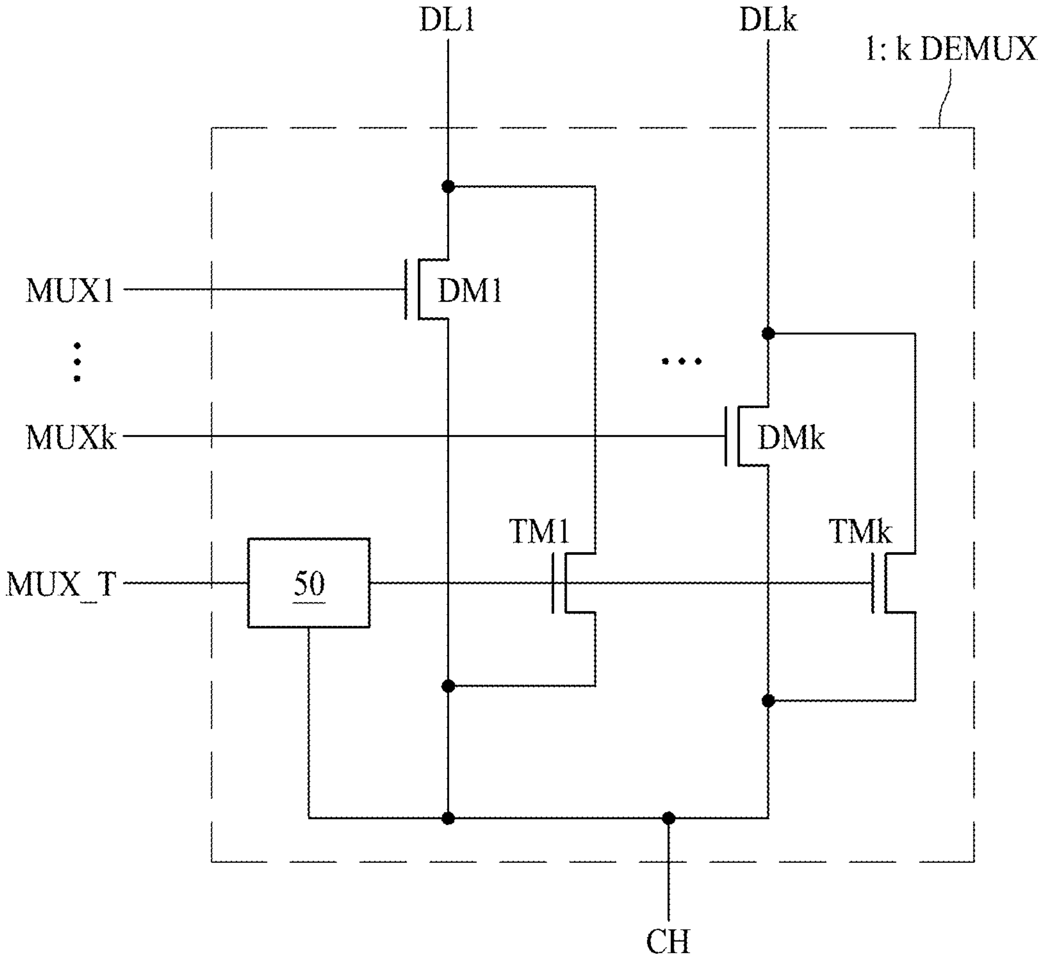
FIG. 5 is an equivalent circuit diagram illustrating a configuration of a demultiplexer (DEMUX) circuit according to one or more embodiments of the present disclosure.
Figure 6:
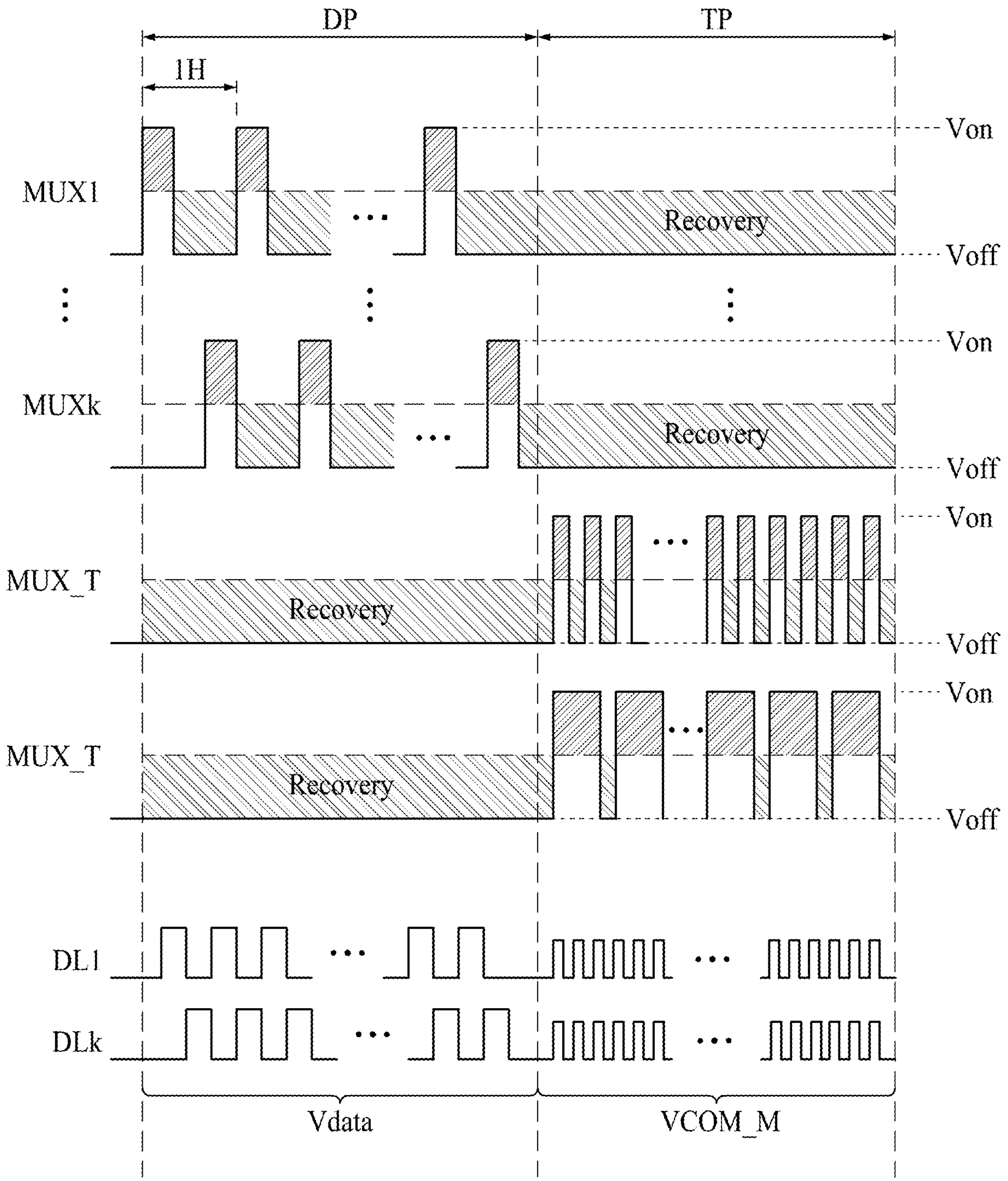
FIG. 6 is an example view illustrating input/output waveforms of the DEMUX circuit shown in FIG. 5.
Figure 7:
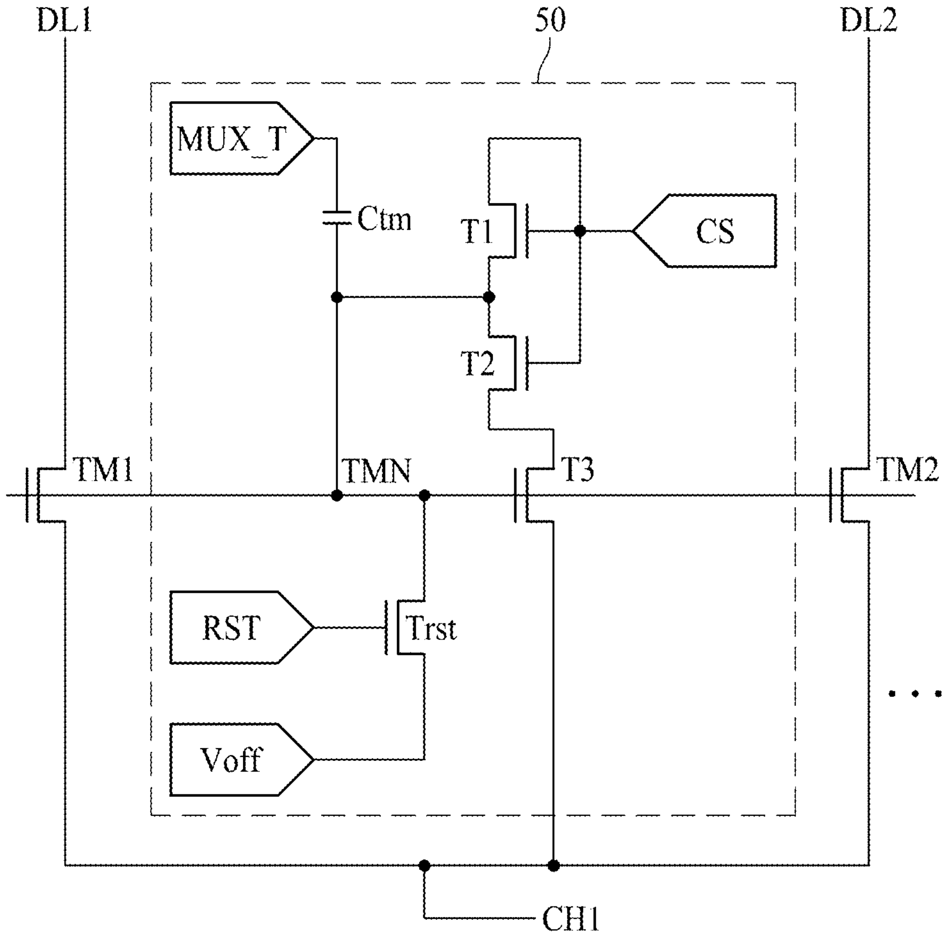
FIG. 7 is an equivalent circuit diagram illustrating a touch switching transistor and a compensation circuit in the DEMUX circuit shown in FIG. 5.
Figure 8:
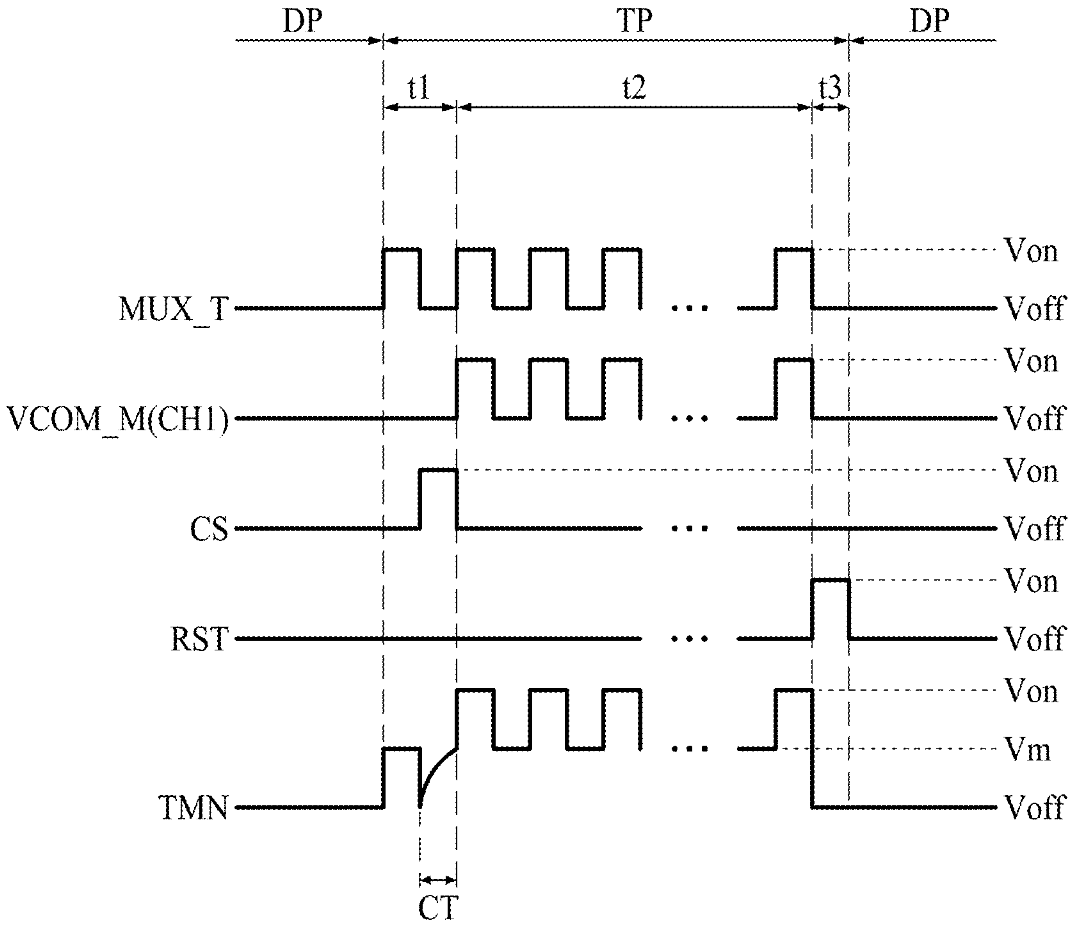
FIG. 8 is an example view illustrating input/output waveforms of a touch switching transistor and a compensation circuit, which are shown in FIG. 7.

FIG. 5 is an equivalent circuit diagram illustrating a configuration of a DEMUX circuit according to one or more embodiments of the present disclosure, FIG. 6 is an example view illustrating input/output waveforms of the DEMUX circuit shown in FIG. 5, FIG. 7 is an equivalent circuit diagram illustrating a touch switching transistor and a compensation circuit in the DEMUX circuit shown in FIG. 5, and FIG. 8 is an example view illustrating input/output waveforms of a touch switching transistor and a compensation circuit, which are shown in FIG. 7.

Referring to FIG. 5, the DEMUX array 330 (see FIG. 2) according to one or more embodiments can include a plurality of 1:k DEMUX circuits for transferring an output of each output terminal CH of a driving circuit to k data lines DL1 to DLk (where k is an integer equal to or greater than 2). The driving circuit can correspond to the SRIC 300 shown in FIG. 2 or the TDDI 320 shown in FIG. 4.

The 1:k DEMUX circuit can include k data switching transistors DM1 to DMk commonly connected to each output terminal CH and connected to k data lines DL1 to DLk, k touch switching transistors TM1 to TMk connected to the k data switching transistors DM1 to DMk in parallel, and a compensation circuit 50 commonly connected to the k touch switching transistors TM1 to TMk.

The k data switching transistors DM1 to DMk can perform a switching operation by receiving k data control signals MUX1 to MUXk from the driving circuits SRIC and TDDI, respectively. The k touch switching transistors TM1 to TMk can perform a switching operation by receiving one touch control signal MUX_T in common through the compensation circuit 50.

Referring to FIGS. 5 and 6, the k data switching transistors DM1 to DMk can repeat a turn-on operation and a turn-off operation during the display operation period DP in response to the k data control signals MUX1 to MUXk, respectively, and can be turned off during the touch operation period TP. Accordingly, the k data switching transistors DM1 to DMk can time-divide the k data signals Vdata sequentially supplied from the driving circuit through the output terminal CH and sequentially transfer them to the k data lines DL1 to DLk during the display operation period DP.

The k touch switching transistors TM1 to TMk can be turned off during the display operation period DP and can repeat the turn-on/turn-off operation periodically during the touch operation period TP, in response to the touch control signal MUX_T supplied through the compensation circuit 50. Accordingly, the touch driving signal VCOM_M supplied from the driving circuit through the output terminal CH during the touch operation period DP can be simultaneously transferred to the k data lines DL1 to DLk. In the touch operation period TP, the touch control signal MUX_T can have the same period as that of the touch driving signal VCOM_M, or can be supplied in the form of a square wave having a period greater than or equal to an integer multiple of the period of the touch driving signal VCOM_M.

The transistors DM1 to DMk and TM1 to TMk of the 1:k DEMUX circuit and the transistors included in the compensation circuit 50 can include k-channel type oxide transistors. The gate-on voltage Von can be a gate high voltage that is a positive voltage, and the gate-off voltage Voff can be a gate low voltage that is a negative voltage.

The transistors DM1 to DMk and TM1 to TMk of the 1:k DEMUX circuit can be applied with a positive bias temperature stress (PBTS) by a positive driving voltage Vgs during the turned-on period by the gate-on voltage Von, and can be applied with a high drain current stress (HDCS) by a high drain current. The transistors DM1 to DMk and TM1 to TMk of the 1:k DEMUX circuit can perform a recovery operation for offsetting the PBTS and the HDCS by receiving a negative bias temperature illumination stress (NBTiS) by a negative driving voltage Vgs during the turned-off period by the gate-off voltage Voff.

Referring to FIGS. 5 and 7, the compensation circuit 50 can include a capacitor Ctm connected to a control node TMN of the touch switching transistors TM1 to TMk, first to third transistors T1, T2 and T3, and a reset transistor Trst.

The capacitor Ctm can be connected between an input line of the touch control signal MUX_T and the control node TMN of the touch switching transistors TM1 to TMk. The capacitor Ctm can receive the touch control signal MUX_T from the driving circuit and apply the received touch control signal MUX_T to the control node TMN.

The first and second transistors T1 and T2 can have a dual gate structure in which a gate electrode is commonly connected to an input line of a compensation signal CS, and the first transistor T1 can have a diode structure in which a gate electrode and a drain electrode are connected. The first and second transistors T1 and T2 can be connected in series. An intermediate node between the first and second transistors T1 and T2 can be connected to the control node TMN, and a source electrode of the second transistor T2 can be connected to a drain electrode of the third transistor T3. The first and second transistors T1 and T2 can connect a third transistor T3 to the diode structure in response to the compensation signal CS.

The third transistor T3 is connected to the output terminal CH like the touch switching transistors TM1 to TMk and its gate electrode is connected to the control node TMN so that the third transistor T3 can be degraded in the same manner as the touch switching transistors TM1 to TMk under the same stress. The third transistor T3 can be expressed as a monitoring transistor. The third transistor T3 can store a threshold voltage in the capacitor Ctm at a compensation time CT when the third transistor is connected to the diode structure through the first and second transistors T1 and T2 for transferring the compensation signal CS.

Accordingly, the capacitor Ctm can apply the touch control signal MUX_T compensated for the threshold voltage to the control node TMN by adding the threshold voltage stored in the supplied touch control signal MUX_T and applying the threshold voltage to the control node TMN during the touch operation period TP. Since the same or similar threshold voltage is shifted due to degradation of the third transistor T3 and the touch switching transistors TM1 to TMk, the capacitor Ctm can store and compensate for the threshold voltage of the third transistor T3, which is the same as or similar to the threshold voltage of the touch switching transistors TM1 to TMk.

The reset transistor Trst can discharge the control node TMN to the gate-off voltage Voff in response to the reset signal RS.

Referring to FIGS. 7 and 8, at a first time t1 of the touch operation period TP, the capacitor Ctm can receive the touch control signal MUX_T of high pulse and apply the same to the control node TMN.

At the compensation time CT of the first time t1, the compensation signal CS of high pulse can be supplied to the first and second transistors T1 and T2 so that the third transistor T3 can be connected to the diode structure. Accordingly, the voltage of the control node TMN can be increased as much as the threshold voltage of the third transistor T3, and the capacitor Ctm can store the threshold voltage of the third transistor T3.

During a second time t2 of the touch operation period TP, the capacitor Ctm can receive the touch control signal MUX_T of an AC type and apply a touch control signal compensated for the threshold voltage stored in the capacitor Ctm to the control node TMN. Accordingly, the touch switching transistors TM1 to TMk can simultaneously supply the touch driving signal VCOM_M supplied from the driving circuit through the output terminal CH to the data lines DL1 and DL2 in response to the touch control signal compensated for the threshold voltage of the control node TMN.

At a third time t3 of the touch operation period TP, the reset transistor Trst can discharge the control node TMN to the gate-off voltage Voff in response to the reset signal RS of high pulse. Accordingly, the touch switching transistors TM1 to TMk can be turned off, and can maintain the turn-off state even during a subsequent display operation period DP.

The compensation circuit 50 can compensate for the threshold voltages of the touch switching transistors TM1 to TMk for each touch operation period TP. Accordingly, even though the threshold voltage is shifted due to degradation of the touch switching transistors TM1 to TMk, the compensation circuit 50 applies the touch control signal compensated for the threshold voltage to the control node TMN to drive the touch switching transistors TM1 to TMk, thereby compensating for the degradation of the touch switching transistors TM1 to TMk and improving reliability.

Figure 9A:
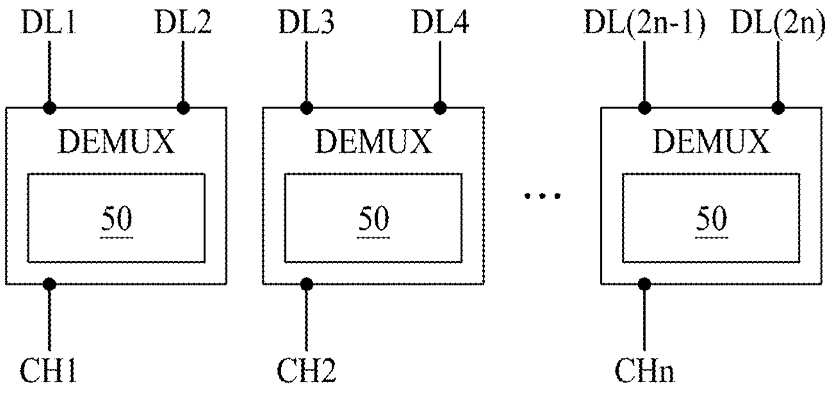
FIGS. 9A to 9C are block diagrams schematically illustrating a DEMUX circuit having a compensation circuit according to one or more embodiments of the present disclosure.
Figure 9B:
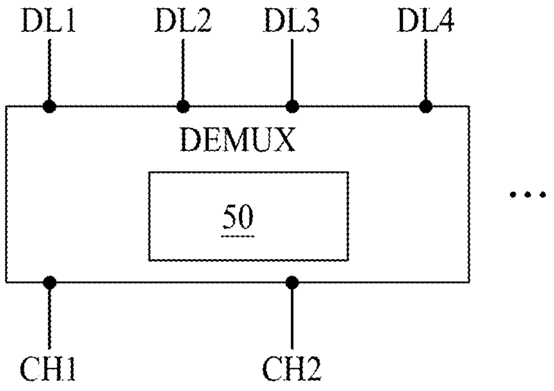
Figure 9C:
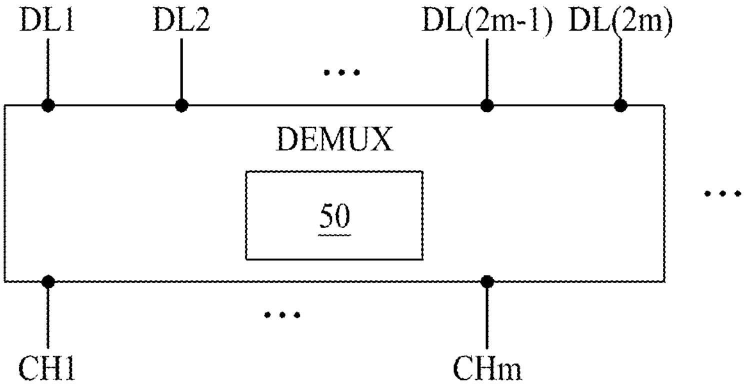

FIGS. 9A to 9C are block diagrams schematically illustrating a DEMUX circuit having a compensation circuit according to one or more embodiments of the present disclosure.

Referring to FIG. 9A, in the display device according to one or more embodiments, the compensation circuit 50 shown in FIG. 7 can be included in each of a plurality of DEMUX circuits respectively connected to a plurality of output terminals CH1 to CHn, for example, in each of a plurality of 1:2 DEMUX circuits.

Referring to FIG. 9B, in the display device according to one or more embodiments, the compensation circuit 50 shown in FIG. 7 can be included in each DEMUX circuit connected to the plurality of output terminals CH1 to CH2, for example, in each 2:4 DEMUX circuit.

Referring to FIG. 9C, in the display device according to one or more embodiments, the compensation circuit 50 shown in FIG. 7 can be included in a DEMUX array connected between a plurality of output terminals CH1 to CHm and a plurality of data lines DL1 to DL2(*m*).

Figure 10:
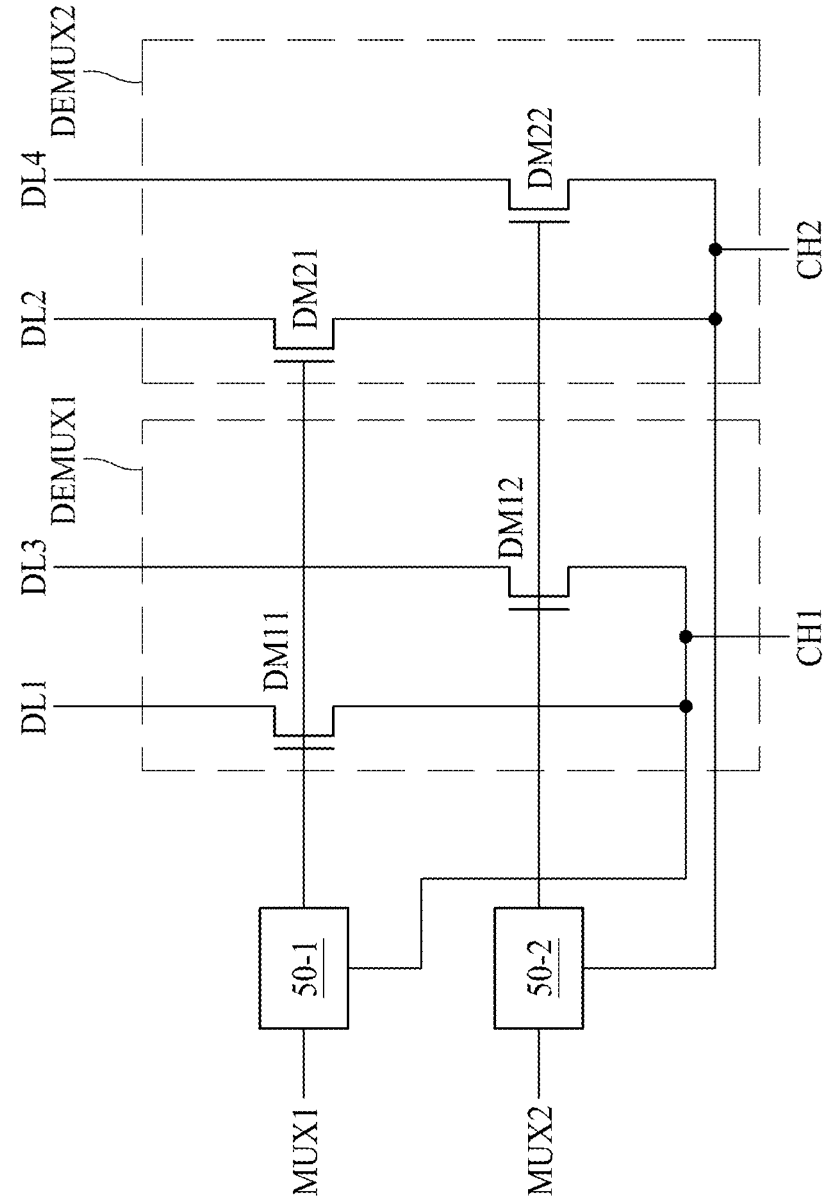
FIG. 10 is an equivalent circuit diagram illustrating a configuration of a DEMUX circuit according to one or more embodiments of the present disclosure.
Figure 11:
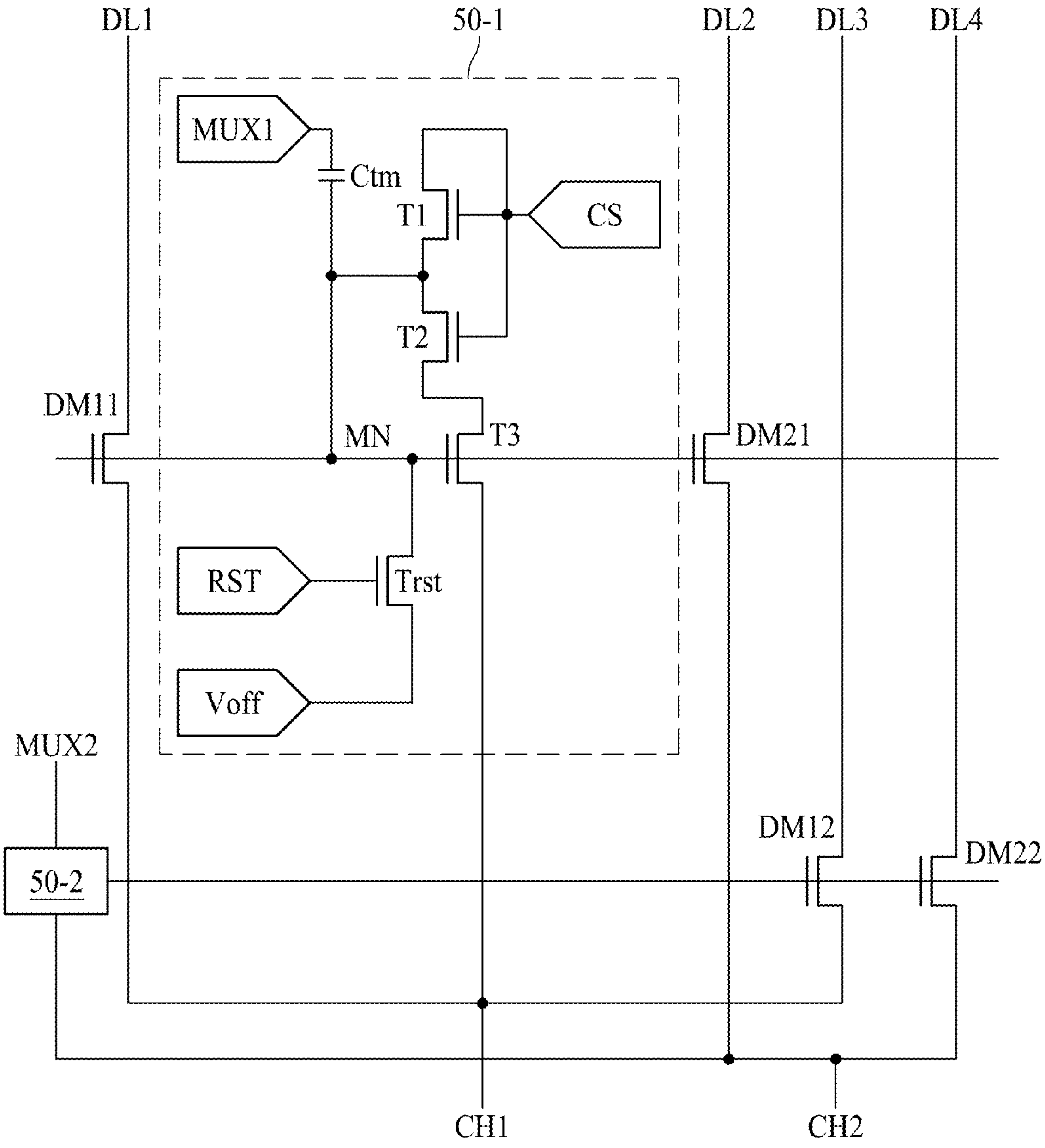
FIG. 11 is an equivalent circuit diagram illustrating a compensation circuit of the DEMUX circuit shown in FIG. 10.
Figure 12:
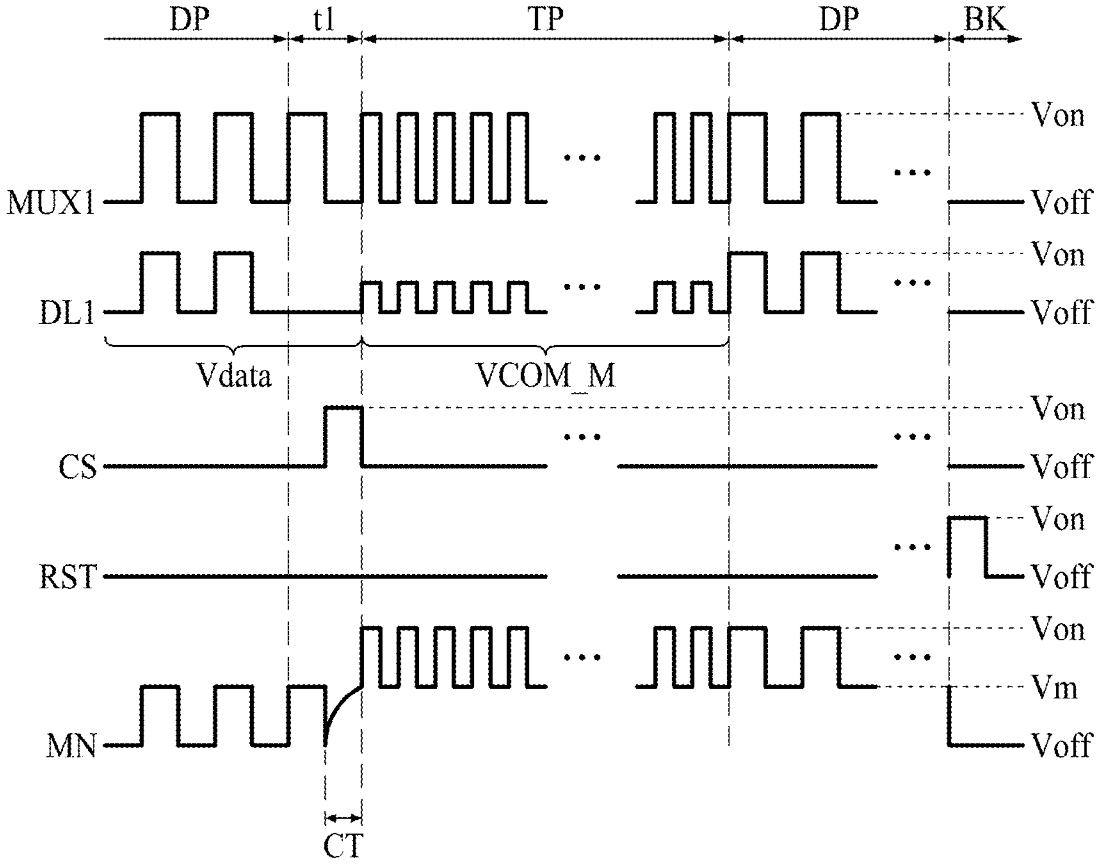
FIG. 12 is an example view illustrating input/output waveforms of the DEMUX circuit shown in FIG. 11.

FIG. 10 is an equivalent circuit diagram illustrating a configuration of a DEMUX circuit according to one or more embodiments of the present disclosure, FIG. 11 is an equivalent circuit diagram illustrating a compensation circuit of the DEMUX circuit shown in FIG. 10, and FIG. 12 is an example view illustrating input/output waveforms of the DEMUX circuit shown in FIG. 11.

Referring to FIGS. 10 and 11, the DEMUX array according to one or more embodiments can include first and second DEMUX circuits DEMUX1 and DEMUX2, and first and second compensation circuits 50-1 and 50-2 connected to the first and second DEMUX circuits DEMUX1 and DEMUX2.

The first DEMUX circuit DEMUX1 can include first and second switching transistors DM11 and DM12 commonly connected to the first output terminal CH1 of the driving circuit and connected to the first and second data lines DL1 and DL3, respectively.

The second DEMUX circuit DEMUX2 can include first and second switching transistors DM21 and DM22 commonly connected to the second output terminal CH2 of the driving circuit and connected to the second and fourth data lines DL2 and DL4, respectively.

The DEMUX circuits DEMUX1 and DEMUX2 can operate by receiving control signals MUX1 and MUX2 in the control node MN through the compensation circuits 50-1 and 50-2. The DEMUX circuits DEMUX1 and DEMUX2 can operate by receiving the control signals compensated for the threshold voltages of the switching transistors DM11, DM12, DM21 and DM22 through the compensation circuits 50-1 and 50-2.

Referring to FIGS. 11 and 12, the switching transistors DM11, DM12, DM21 and DM22 of the first and second circuits DEMUX1 and DEMUX2 can distribute and supply the data voltage Vdata supplied through the first and second output terminals CH1 and CH2 to the first to fourth data lines DL1 to DL4 in response to the control signals MUX1 and MUX2 supplied to the control node MN through the compensation circuits 50-1 and 50-2 during the display operation period DP.

The switching transistors DM11, DM12, DM21 and DM22 of the first and second DEMUX circuits DEMUX1 and DEMUX2 can simultaneously supply the touch driving signal VCOM_M supplied through the first and second output terminals CH1 and CH2 to the first to fourth data lines DL1 to DL4 in response to the control signals MUX1 and MUX2 supplied to the control node MN through the compensation circuits 50-1 and 50-2 during the touch operation period TP.

The first compensation circuit 50-1 can be commonly connected to the first switching transistors DM11 and DM21 that have received the first control signal MUX1 from the first and second DEMUX1 and DEMUX2.

The first compensation circuit 50-1 can include a capacitor Ctm connected to the control node MN of the first switching transistors DM11 and DM21, first to third transistors T1, T2 and T3, and a reset transistor Trst.

The capacitor Ctm can receive the control signal MUX1 from the driving circuit and apply the control signal MUX1 to the control node MN. The first and second transistors T1 and T2 can connect the third transistor T3 to the diode structure in response to the compensation signal CS, and the third transistor T3 can store the threshold voltage in the capacitor Ctm at the compensation time CT when it is connected to the diode structure. Accordingly, the capacitor Ctm can compensate for the degradation of the first switching transistors DM11 and DM21 by applying the control signal compensated for the threshold voltage to the control node MN. The reset transistor Trst can discharge the control node TMN to the gate-off voltage Voff in response to the reset signal RS.

The second compensation circuit 50-2 can be commonly connected to the second transistors DM11 and DM21 that have received the second control signal MUX2 from the first and second DEMUX1 and DEMUX2. The second compensation circuit 50-2 can have a structure similar to that of the first compensation circuit 50-1.

In the compensation circuits 50-1 and 50-2, the first time t1 including the compensation time CT for storing the threshold voltage in each capacitor Ctm can be arranged between the display operation period DP and the touch operation period TP.

In the compensation circuits 50-1 and 50-2, the first time t1 including the compensation time CT for storing the threshold voltage in each capacitor Ctm can be included in a blank period immediately before an active period of each frame starts.

In the compensation circuits 50-1 and 50-2, the time to reset the control node MN in response to a reset pulse RST can be arranged in a blank period immediately after the active period of each frame ends.

As described above, the DEMUX circuits DEMUX1 and DEMUX2 according to one or more embodiments can operate by receiving the control signal compensated for the threshold voltages of the switching transistors DM11, DM12, DM21 and DM22 through the compensation circuits 50-1 and 50-2 during the display operation period DP and the touch operation period TP, thereby compensating for the degradation of the switching transistors DM11, DM12, DM21 and DM22 and improving reliability.

Figure 13:
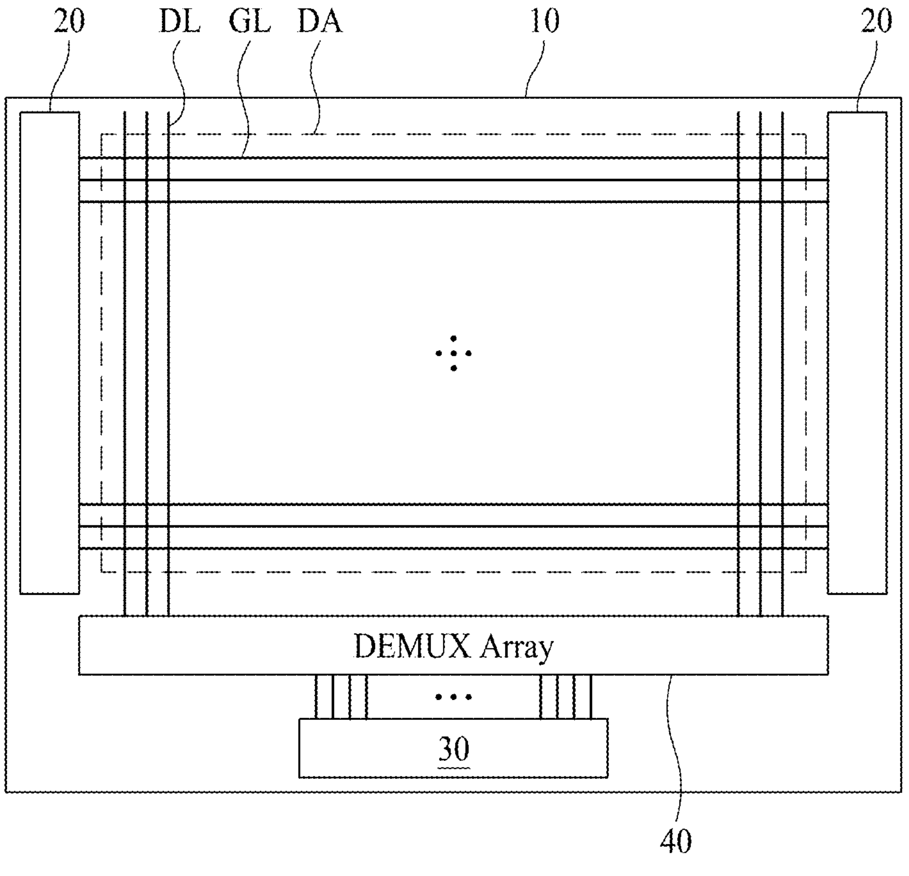
FIG. 13 is an example view illustrating a configuration of a display device according to one or more embodiments of the present disclosure.
Figure 14:
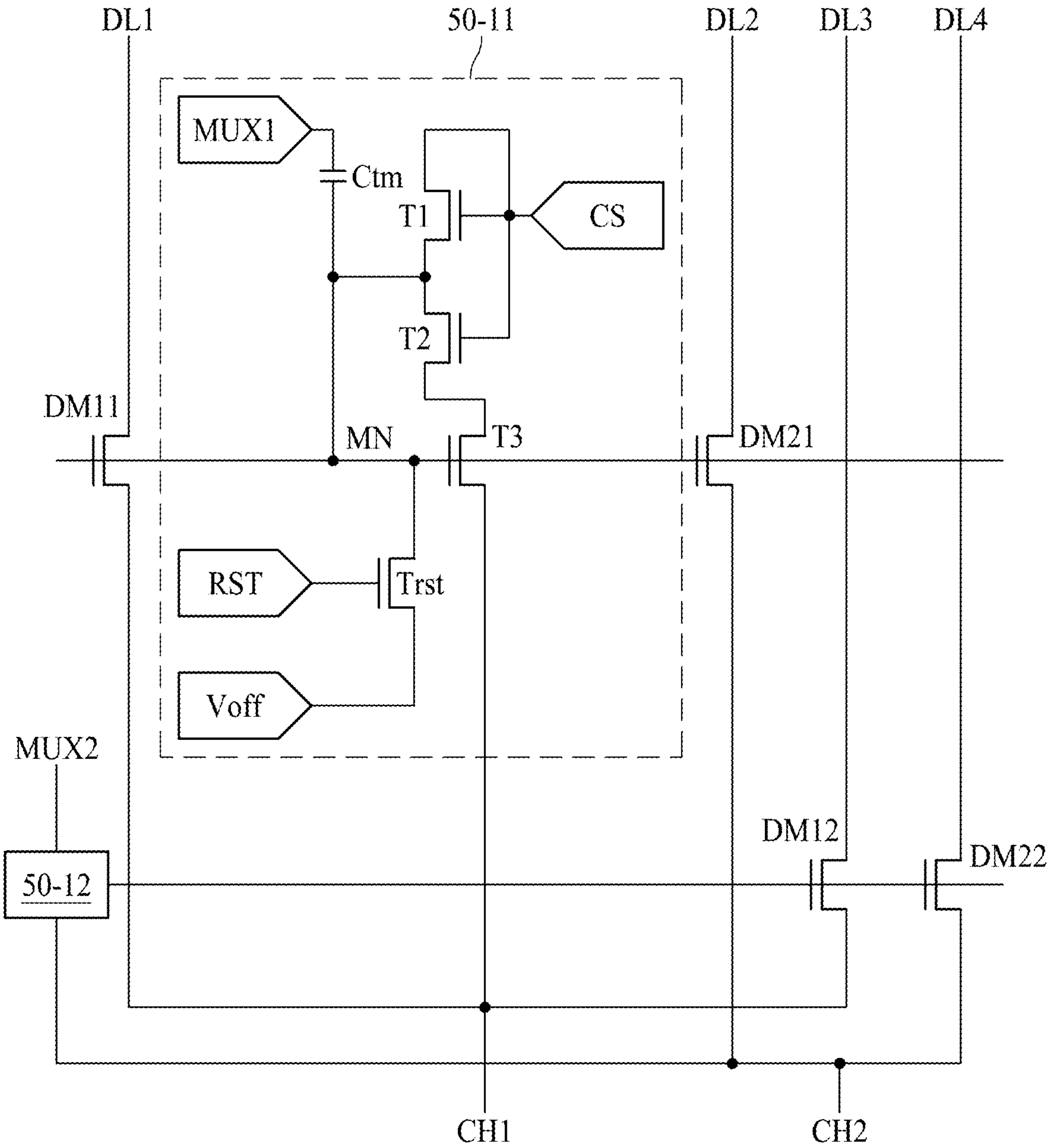
FIG. 14 is an equivalent circuit diagram illustrating the DEMUX circuit shown in FIG. 13.
Figure 15:
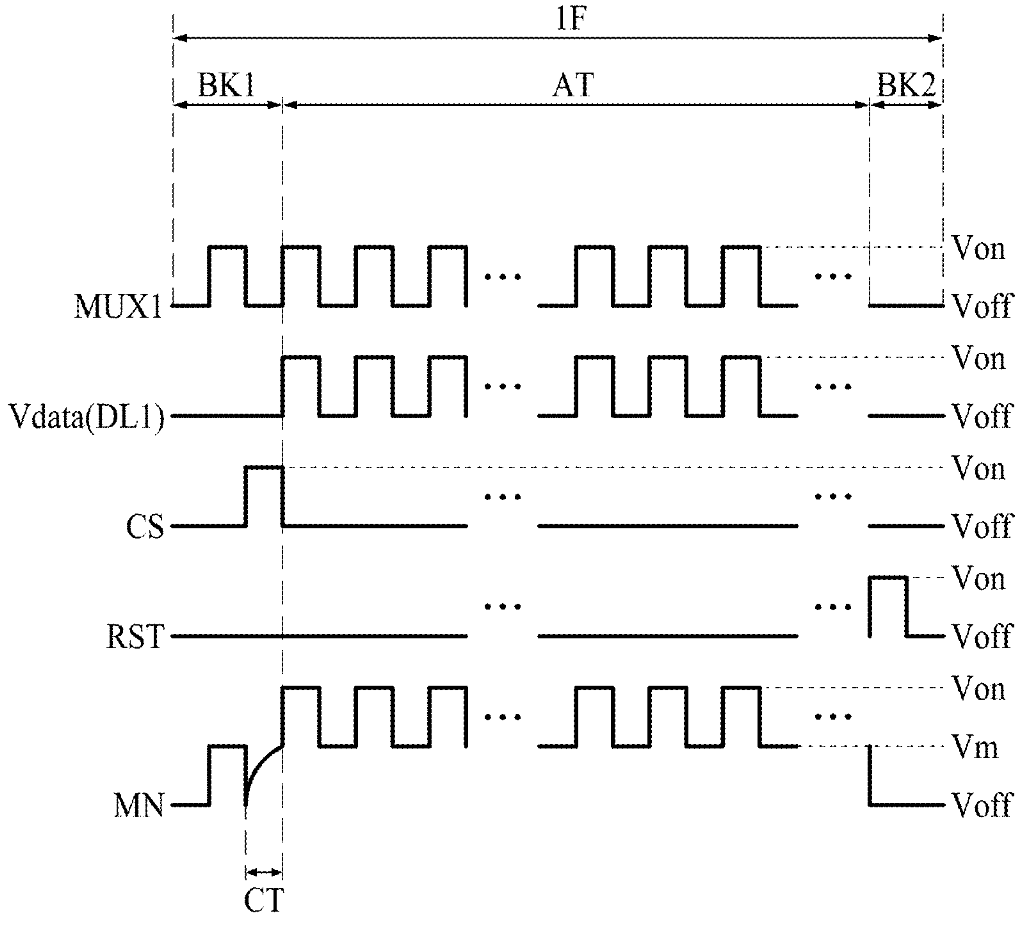
FIG. 15 is an example view illustrating input/output waveforms of the DEMUX circuit shown in FIG. 14.

FIG. 13 is an example view illustrating a configuration of a display device according to one or more embodiments of the present disclosure, FIG. 14 is an equivalent circuit diagram illustrating the DEMUX circuit shown in FIG. 13, and FIG. 15 is an example view illustrating input/output waveforms of the DEMUX circuit shown in FIG. 14.

Referring to FIG. 13, the display device according to one or more embodiments can include a display panel 10 having a display area DA, a gate driver 20 embedded in a bezel area of the display panel 10, driving gate lines GL of the display area DA, a data driving circuit 30 arranged in the bezel area, driving data lines DL of the display area DA, and a DEMUX array 40 arranged in the bezel area between the data driving circuit 30 and the display area DA.

The DEMUX array 40 can include a plurality of DEMUX circuits DEMUX1 and DEMUX2, and a plurality of compensation circuits 50-11 and 50-12 connected to the plurality of DEMUX circuits DEMUX1 and DEMUX2.

The first DEMUX circuit DEMUX1 can include first and second switching transistors DM11 and DM12 commonly connected to the first output terminal CH1 of the driving circuit and connected to the first and second data lines DL1 and DL3, respectively.

The second DEMUX circuit DEMUX2 can include first and second switching transistors DM21 and DM22 commonly connected to the second output terminal CH2 of the driving circuit and connected to the second and fourth data lines DL2 and DL4, respectively.

The DEMUX circuits DEMUX1 and DEMUX2 can operate by receiving the control signals MUX1 and MUX2 in the control node MN through the compensation circuits 50-11 and 50-12. The DEMUX1 and DEMUX2 can operate by receiving the control signals compensated for the threshold voltages of the switching transistors DM11, DM12, DM21 and DM22 through the compensation circuits 50-11 and 50-12.

Referring to FIGS. 14 and 15, the switching transistors DM11, DM12, DM21 and DM22 of the DEMUX circuits DEMUX1 and DEMUX2 can distribute and supply the data voltage Vdata supplied through the plurality of output terminals CH1 and CH2 in response to the control signals MUX1 and MUX2 supplied to the control node MN through the compensation circuits 50-11 and 50-12 during an active period AT of each frame 1F.

The first compensation circuit 50-11 can be commonly connected to the first switching transistors DM11 and DM21 that have received the first control signal MUX1 from the DEMUX circuits DEMUX1 and DEMUX2. Since the first compensation circuit 50-11 is the same as the first compensation circuit 50-1 shown in FIG. 11, its detailed description will be omitted.

The second compensation circuit 50-12 can be commonly connected to the second transistors DM11 and DM21 that have received the second control signal MUX2 from the first and second DEMUX circuits DEMUX1 and DEMUX2. The second compensation circuit 50-12 can have a structure similar to that of the first compensation circuit 50-11.

In the compensation circuits 50-11 and 50-12, the first time t1 including the compensation time CT for storing the threshold voltage in each capacitor Ctm can be included in the blank period BK1 immediately before the active period AT of each frame 1F starts.

In the compensation circuits 50-11 and 50-12, the time to reset the control node MN in response to the reset pulse RST can be included in the blank period BK2 immediately after the active period AT of each frame 1F ends.

In the compensation circuits 50-11 and 50-12, the capacitor Ctm can apply the control signals MUX2 to the control node MN by receiving the control signals MUX1 and MUX2 from the driving circuit. The first and second transistors T1 and T2 can connect the third transistor T3 to the diode structure in response to the compensation signal CS, and the third transistor T3 can store the threshold voltage in the capacitor Ctm at the compensation time CT when it is connected to the diode structure. Accordingly, the capacitor Ctm can compensate for the degradation of the switching transistors DM11, DM12, DM21 and DM22 by applying the control signal compensated for the threshold voltage to the control node MN.

As described above, the DEMUX circuits DEMUX1 and DEMUX2 according to one or more embodiments of the present disclosure can operate by receiving the control signal compensated for the threshold voltages of the switching transistors DM11, DM12, DM21 and DM22 through the compensation circuits 50-1 and 50-2 for each frame 1F, thereby compensating for the degradation of the switching transistors DM11, DM12, DM21 and DM22 and improving reliability.

According to the present disclosure, the following advantageous effects can be obtained.

In the display device according to one or more embodiments of the present disclosure, since the DEMUX circuit can compensates for the threshold voltage of the thin film transistor by using the compensation circuit connected to the thin film transistors, it can compensate for the degradation of the thin film transistor even in spite of increase in temperature, thereby making sure of reliability in high temperature operation.

In the display device according to one or more embodiments of the present disclosure, the DEMUX circuit can reduce the size of each thin film transistor and thus reduce power consumption by compensating for the degradation of thin film transistors, thereby achieving a low power consumption effect.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the disclosure and the claims, but should be construed to include all possible embodiments along with the full scope of equivalents to which such claims are entitled. Accordingly, the claims are not limited by the disclosure.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that the present disclosure described above is not limited by the above-described embodiments and the accompanying drawings and that various substitutions, modifications and variations can be made in the present disclosure without departing from the scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A display device comprising:

a display panel including a display area in which a plurality of subpixels are arranged;

a driving circuit configured to output data signals during a display operation period and a touch driving signal during a touch operation period, through each output terminal of the driving circuit; and a demultiplexer (DEMUX) array including a plurality of DEMUX circuits and a compensation circuit, which are arranged between the driving circuit and the display area in the display panel, wherein each of the plurality of DEMUX circuits includes:

a plurality of data switching transistors connected between the output terminal of the driving circuit and a plurality of data lines; and a plurality of touch switching transistors connected between the output terminal of the driving circuit and the plurality of data lines, and configured to share a control node, and wherein the compensation circuit is configured to:

compensate for a threshold voltage of a monitoring transistor sharing the control node with the plurality of touch switching transistors to store the threshold voltage in a capacitor, compensate a touch control signal applied to the capacitor for the threshold voltage stored in the capacitor, and apply the touch control signal compensated for the threshold voltage to the control node.

2. The display device of claim 1, wherein the compensation circuit includes:

the capacitor connected between an input line of the touch control signal and the control node;

the monitoring transistor configured to share the control node and connected to the output terminal of the driving circuit;

first and second transistors having a dual gate structure and configured to connect the monitoring transistor to a diode structure in response to a compensation signal; and a reset transistor configured to discharge the control node in response to a reset signal, and wherein an intermediate node between the first and second transistors is connected to the control node.

3. The display device of claim 2, wherein:

the capacitor is configured to apply the touch control signal to the control node at a first time between the display operation period and the touch operation period, the first and second transistors are configured to connect the monitoring transistor to the diode structure in response to the compensation signal to store the threshold voltage of the monitoring transistor in the capacitor, at a compensation time of the first time, and the touch control signal compensated for the threshold voltage is applied to the control node through the capacitor, to which the touch control signal is applied, during the touch operation period.

4. The display device of claim 3, wherein the reset transistor is configured to discharge the control node to a gate-off voltage in response to the reset signal at a second time immediately after the touch operation period.

5. The display device of claim 1, wherein each of the plurality of touch switching transistors is connected to each of the plurality of data switching transistors in parallel.

6. The display device of claim 1, wherein the plurality of data switching transistors are sequentially configured to transfer the data signals supplied from the output terminal of the driving circuit to the plurality of data lines in response to each of a plurality of data control signals during the display operation period.

7. The display device of claim 1, wherein the plurality of touch switching transistors are simultaneously configured to transfer the touch driving signal supplied from the output terminal of the driving circuit to the plurality of data lines in response to the touch control signal compensated for the threshold voltage during the touch operation period.

8. The display device of claim 7, wherein the touch control signal applied to the capacitor and the touch control signal compensated for the threshold voltage are applied in the form of a square wave having a same period or an integer multiple period as that of the touch driving signal.

9. The display device of claim 7, wherein the compensation circuit is arranged in each of the plurality of DEMUX circuits, or is arranged in each of a plurality of groups which divide the plurality of DEMUX, or is arranged in the DEMUX array so that it is to be shared by the plurality of DEMUX circuits.

10. The display device of claim 7, wherein the first and second touch control signals respectively applied to the first and second capacitors, and the first control signal compensated for the first threshold voltage and the second control signal compensated for the second threshold voltage are applied in the form of a square wave having a same period as that of the touch driving signal during the touch operation period.

11. A display device comprising:

a display panel including a display area in which a plurality of subpixels are arranged;

a driving circuit configured to output data signals during a display operation period and a touch driving signal during a touch operation period, through each output terminal of the driving circuit; and a demultiplexer (DEMUX) array including a plurality of DEMUX circuits and a compensation circuit, which are arranged between the driving circuit and the display area in the display panel, wherein each of the plurality of DEMUX circuits includes first and second switching transistors connected between the output terminal of the driving circuit and a plurality of data lines, and wherein the compensation circuit includes:

a first compensation circuit configured to compensate for a first threshold voltage of a first monitoring transistor, which is configured to share a first control node with the first switching transistors of the plurality of DEMUX circuits, store the first threshold voltage in a first capacitor, compensate a first control signal applied to the first capacitor for the first threshold voltage stored in the first capacitor, and apply the first control signal compensated for the first threshold voltage to the first control node; and a second compensation circuit configured to compensate for a second threshold voltage of a second monitoring transistor, which is configured to share a second control node with the second switching transistors of the plurality of DEMUX circuits, store the second threshold voltage in a second capacitor, compensate a second control signal applied to the second capacitor for the second threshold voltage stored in the second capacitor, and apply the second control signal compensated for the second threshold voltage to the second control node.

12. The display device of claim 11, wherein the first compensation circuit includes:

the first capacitor connected between an input line of the first control signal and the first control node;

the first monitoring transistor configured to share the first control node, and connected to the output terminal of the driving circuit;

first and second transistors having a dual gate structure and configured to connect the first monitoring transistor to a diode structure in response to a compensation signal; and a reset transistor configured to discharge the first control node in response to a reset signal, and wherein an intermediate node between the first and second transistors is connected to the first control node.

13. The display device of claim 11, wherein the second compensation circuit includes:

the second capacitor connected between an input line of the second control signal and the second control node;

the second monitoring transistor configured to share the second control node, connected to the output terminal of the driving circuit;

first and second transistors having a dual gate structure and configured to connect the second monitoring transistor to a diode structure in response to the compensation signal; and a reset transistor configured to discharge the second control node in response to a reset signal, and wherein an intermediate node between the first and second transistors is connected to the second control node.

14. The display device of claim 11, wherein the first and second switching transistors are sequentially configured to transfer the data signals supplied from the output terminal of the driving circuit to the plurality of data lines in response to the first control signal compensated for the first threshold voltage and the second control signal compensated for the second threshold voltage during the display operation period.

15. The display device of claim 11, wherein the first and second switching transistors are sequentially configured to transfer the touch driving signal supplied from the output terminal of the driving circuit to the plurality of data lines in response to the first control signal compensated for the first threshold voltage and the second control signal compensated for the second threshold voltage during the touch operation period.

16. A display device comprising:

a display panel including a display area in which a plurality of subpixels are arranged;

a driving circuit configured to output data signals through each output terminal of the driving circuit; and a demultiplexer (DEMUX) array including a plurality of DEMUX circuits and a compensation circuit, which are arranged between the driving circuit and the display area in the display panel, wherein each of the plurality of DEMUX circuits includes first and second switching transistors connected between the output terminal of the driving circuit and a plurality of data lines, and wherein the compensation circuit includes:

a first compensation circuit configured to compensate for a first threshold voltage of a first monitoring transistor, which is configured to share a first control node with the first switching transistors of the plurality of DEMUX circuits, store the first threshold voltage in a first capacitor, compensate a first control signal applied to the first capacitor for the first threshold voltage stored in the first capacitor, and apply the first control signal compensated for the first threshold voltage to the first control node; and a second compensation circuit configured to compensate for a second threshold voltage of a second monitoring transistor, which is configured to share a second control node with the second switching transistors of the plurality of DEMUX circuits, store the second threshold voltage in a second capacitor, compensate a second control signal applied to the second capacitor for the second threshold voltage stored in the second capacitor, and apply the second control signal compensated for the second threshold voltage to the second control node.

17. The display device of claim 16, wherein the first compensation circuit includes:

the first capacitor connected between an input line of the first control signal and the first control node;

the first monitoring transistor configured to share the first control node, connected to the output terminal of the driving circuit;

first and second transistors having a dual gate structure and configured to connect the first monitoring transistor to a diode structure in response to a compensation signal; and a reset transistor configured to discharge the first control node in response to a reset signal, and wherein an intermediate node between the first and second transistors is connected to the first control node.

18. The display device of claim 16, wherein the second compensation circuit includes:

the second capacitor connected between an input line of the second control signal and the second control node;

the second monitoring transistor configured to share the second control node, connected to the output terminal of the driving circuit;

first and second transistors having a dual gate structure and configured to connect the second monitoring transistor to a diode structure in response to the compensation signal; and a reset transistor configured to discharge the second control node in response to a reset signal, and wherein an intermediate node between the first and second transistors is connected to the second control node.

19. The display device of claim 16, wherein the first and second switching transistors are sequentially configured to transfer the data signals supplied from the output terminal of the driving circuit to the plurality of data lines in response to the first control signal compensated for the first threshold voltage and the second control signal compensated for the second threshold voltage.

20. The display device of claim 16, wherein:

a first period at which the first threshold voltage is stored in the first capacitor and the second threshold voltage is stored in the second capacitor is included in a first blank period located before an active period of each frame period, and the first and second control nodes are reset to gate-off voltages at a second blank period located after the active period of each frame period.

* * * * *